C. C. CARPENTER AND R. J. ELLIS.
BATTERY CELL AND VENT MEANS THEREFOR.
APPLICATION FILED SEPT. 13, 1916.
1,336,506.  Patented Apr. 13, 1920.
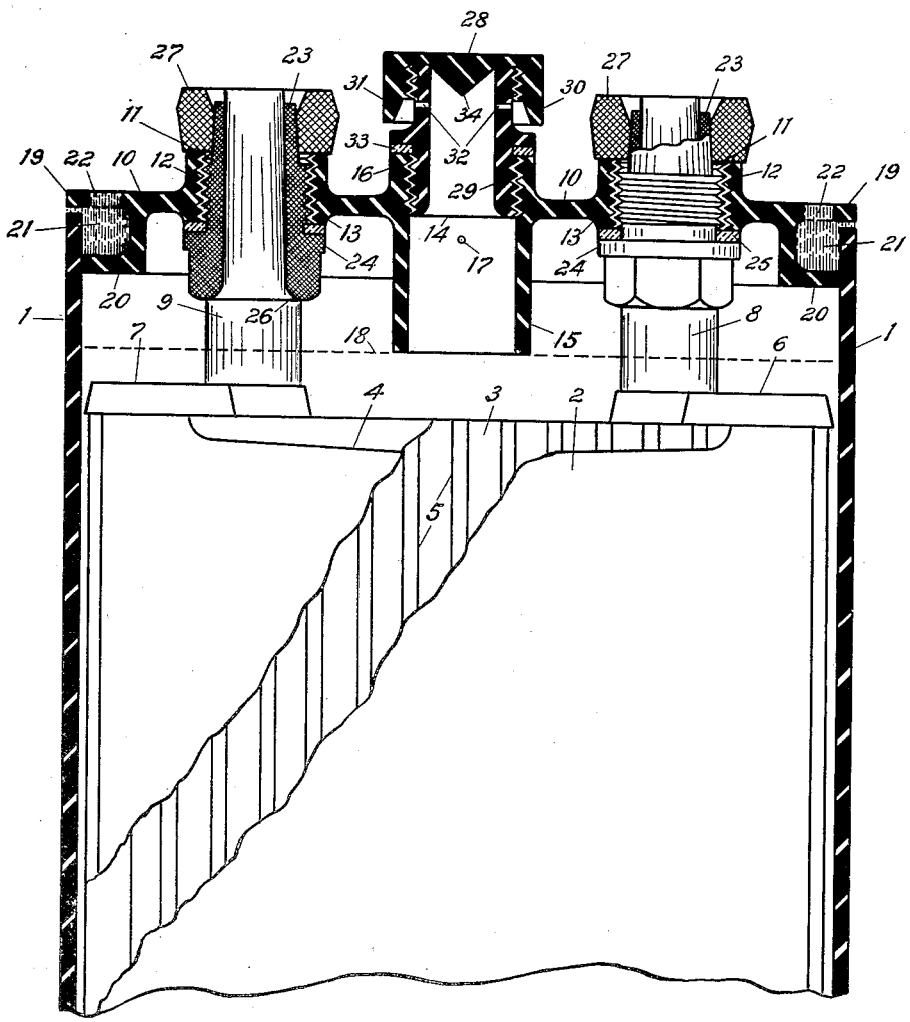
Inventor
Campbell C. Carpenter
Roy J. Ellis.
By 
Attorney
Witnesses

UNITED STATES PATENT OFFICE.

CAMPBELL C. CARPENTER AND ROY J. ELLIS, OF NIAGARA FALLS, NEW YORK, ASSIGNORS TO U. S. LIGHT & HEAT CORPORATION, OF NIAGARA FALLS, NEW YORK, A CORPORATION OF NEW YORK.

BATTERY-CELL AND VENT MEANS THEREFOR.

1,336,506.  Specification of Letters Patent.  Patented Apr. 13, 1920.

Original application filed April 6, 1916, Serial No. 89,290. Divided and this application filed September 13, 1916. Serial No. 119,833.

*To all whom it may concern:*

Be it known that we, CAMPBELL C. CARPENTER and ROY J. ELLIS, citizens of the United States, residing at Niagara Falls, in the county of Niagara and State of New York, have invented new and useful Improvements in Battery-Cells and Vent Means Therefor, of which the following is a specification.

The present invention relates to battery cells and vent means therefor.

An object of the present invention is to provide a battery cell having improved vent means whereby to minimize the escape of the electrolyte from the battery cell and at the same time, to permit the escape of gases.

A further object is to provide a battery cell cover through which the battery cell may be conveniently refilled when the electrolyte gets low and by means of which flooding is prevented.

A further object is to provide a construction whereby, should any electrolyte escape through the vents, it will be prevented from spurting from the cell.

A further object is to provide a battery cell cover having vents which are protected against clogging and in which the vents are prevented from admitting foreign materials into the interior of the cell.

Further objects will appear as the description proceeds.

This application is a division of our application, Serial No. 89,290, filed April 6, 1916, for battery cells.

The one figure of the drawing represents a battery cell having improved vent means according to the present invention.

The numeral 1 indicates the walls of a jar which may be of any suitable material as, for instance, hard rubber. Located within said jar are the usual battery plates and separators. One of said plates is indicated by the numeral 2. Said plate 2 is shown broken away to show a separator 3, which is also shown broken away to disclose a plate 4 of polarity opposite to plate 2. Separator 3 is shown as provided with the usual ribs 5. Plates 2 of like polarity are united by a strap 6 joined thereto in the usual way. Plates 4 are also united by a strap 7. If desired, straps 6 and 7 may rest upon the tops of the separators, serving to hold said separators against movement. Integrally formed with the straps 6 and 7 are the posts 8 and 9. Straps 6 and 7 and posts 8 and 9 may be of lead or other suitable material.

Mounted on the top of the jar 1 is a cover indicated by the numeral 10. This cover may be of any suitable material as for instance, hard rubber. Said cover is provided with two apertures 11, surrounded by collars 12 on the upper side of the cover and bosses 13 on the lower side of the cover. Said cover is provided with an opening 14, surrounded by a collar 15 on the under side of the cover and a boss 16 on the upper side thereof. Said collar 15 is provided with apertures 17 for a purpose which will appear hereinafter. Said collar 15 should extend downwardly to the normal level of the electrolyte, which level is indicated by the broken line 18.

The cover 10 is provided with edge portions 19 coinciding in contour and dimensions with the outside of the jar 1. Depending from the cover is a flange 20, formed to provide a trough extending around the cover. This trough is adapted to hold a sealing compound 21 which may be poured into said trough through apertures 22 in the cover. The sealing compound forms an effective seal to prevent the electrolyte from leaking between the cover and the walls of the jar.

Located in the apertures 11 are bushings 23 which may be of lead or other suitable material. Said bushings 23 are externally screw-threaded to engage internally screw-threaded portions of the collars 12. Said bushings may be provided with collars 24 adapted to engage gaskets 25 of rubber or other suitable material. When said bushings are screwed into place and the gaskets 25 tightly compressed between the collars 24 and the bosses 13, an effective seal is provided between each bushing and the cover.

The bushings 23 are adapted to receive the cell posts 8 and 9, each post being provided with a shoulder 26 to engage the lower end of one of said bushings. Resting on the tops of the collars 12 and engaging the tops of the bushings 23 are the usual links 27, connecting posts of unlike polarity of adjacent cells. In the assembling of a cell, when the cover with its bushings has been placed over the cell posts and the links 27 have been put in place, the top of each post, the top of its bushing 23 and the adjacent part of the link 27 will be burnt into one integral mass, sufficient lead being added to fill up the aperture in link 27, making a smooth joint. A perfect electrical and mechanical connection is thus provided between each post and its link, which also effectually prevents the escape of any electrolyte which might otherwise creep up the posts. The posts 8 and 9, the bushings 23 and links 27 are represented on the drawing as they appear before burning, for the purpose of showing at a glance how the parts are assembled.

Screw threaded into the boss 16 is a cup-shaped cap 28 for the aperture 14. This cap 28 is shown as composed of two parts 29 and 30, screw threaded together, the outer portion 30 being provided with a depending apron portion 31, located in front of the apertures 32 in the portion 29. A gasket 33 of any suitable material, may be provided between the cap 28 and the boss 16.

Obviously, the cap could be made of only one part, if desired, the part 29 being dispensed with, the vents 32 being located in the collar 16 and the portion 30 being screwed down over an external screw thread on the collar 16.

In use, the cap 28 will be removed for the purpose of pouring the electrolyte into the jar. When the level of the electrolyte has reached the bottom of the collar 15, it will be at the desired height. When more electrolyte is added, it will suddenly fill up the space within the collar, constituting a sign to the attendant to discontinue the pouring. The filling up of the space within the collar 15 will be due to the fact that the air in the upper part of the cell will not be able to escape through the aperture 17 with sufficient rapidity to maintain an even level of the electrolyte over its entire surface. When the attendant sees the electrolyte welling up within the collar 15, he will discontinue pouring. The small amount of electrolyte within the collar 15 will at once seek the level of the electrolyte, raising said level only a very inconsiderable amount. Flooding of the cell will therefore be prevented. Gases may escape through the apertures 17 and 32. The cell would have to be tilted to a degree never encountered in automobile practice, before the electrolyte could flow through opening 14 and apertures 32. If, however, due to the bubbling which may occur, some of the electrolyte is sprayed up through the collar and out of the aperture 32, it is prevented from spurting by the apron 31. Inasmuch as the collar 15 covers only a small part of the surface of the electrolyte, only a small amount of spray can reach the apertures 32. The drops condensing from this spray will fall harmlessly upon the top of the cover 10, whence they may be collected by any convenient means. The apron 31 also protects the apertures 32 from being clogged by dirt and also serves to prevent foreign substances from finding their way into the cell through said apertures 32. The under wall of the top portion of the cap 28 is of conical shape with the apex 34 centrally placed. As a consequence, any electrolyte which is sprayed upon the top of the cap will collect at the apex 34 and drop back into the cell.

One embodiment of the present invention has been described in detail. Many modifications will suggest themselves to those skilled in the art. It is intended that this case shall cover all such modifications that fall within the scope of the invention as defined by the appended claims.

What we claim as new and desire to secure by Letters Patent of the United States, is—

1. A battery cell comprising a jar adapted to contain electrolyte, a cover provided with an aperture, said aperture being surrounded by a downwardly extending collar integral with said cover, said collar extending downwardly to the normal level of said electrolyte, said collar being provided with an aperture adjacent the point of attachment to said cover, said last named aperture being very small compared to the opening to the jar provided by said collar and being always open to the atmosphere.

2. A battery cell cover provided with an opening suitable to permit the passage of gases and of liquid, a removable cap for said opening, said cap being provided with an aperture in its side wall and being also provided with a depending apron portion shielding said aperture.

3. A battery cell comprising a jar adapted to contain electrolyte, a cover for said jar containing an opening, a collar surrounding said opening and extending downwardly to the normal level of said electrolyte, said collar being provided with a small aperture near said cover, a removable cap for said opening, said cap being provided with apertures and being also provided with an apron portion to shield said last mentioned apertures.

4. A battery cell having a cover provided with an opening, a cap for said opening, said cap being provided with vents and being also provided with a downwardly extending conical projection on its inside whereby to deflect electrolyte away from said vents.

5. A battery cell cover provided with an opening suitable to permit the passage of gases and of liquid, a collar member surrounding said opening, a removable cap member for said collar member, one of said members being provided with an aperture, said cap member being provided with a depending apron portion shielding said aperture.

6. A battery cell cover provided with an opening, a collar member surrounding said opening, a removable cap member for said collar member, one of said members being provided with circumferentially spaced openings, said cap member being provided with a circumferential apron portion shielding said openings.

7. A battery cell comprising a jar adapted to contain electrolyte, a cover for said jar containing an opening, a collar surrounding said opening and extending downwardly to the normal level of said electrolyte, said collar being provided with a small aperture near said cover, an upstanding member surrounding said opening, a removable cap member for said opening engaging said upstanding member, one of said members being provided with apertures, said cap member being also provided with an apron portion to shield said last mentioned apertures.

8. A battery cell having a cover provided with an opening, a collar member surrounding said opening, a cap member for said collar member, one of said members being provided with vents, said cap member being provided with a downwardly extending conical projection on its inside whereby to deflect electrolyte away from said vents.

In witness whereof, we have hereunto subscribed our names.

CAMPBELL C. CARPENTER.
ROY J. ELLIS.